(12) United States Patent
Yamanoi et al.

(10) Patent No.: US 6,631,103 B1
(45) Date of Patent: Oct. 7, 2003

(54) JITTER FEEDBACK SLICER

(75) Inventors: Koyu Yamanoi, Funabashi (JP); Takashi Sugasawa, Kawasaki (JP)

(73) Assignee: Texas Instruments Incorporated, Dallas, TX (US)

( * ) Notice: Subject to any disclaimer, the term of this patent is extended or adjusted under 35 U.S.C. 154(b) by 715 days.

(21) Appl. No.: 09/057,573

(22) Filed: Apr. 9, 1998

(51) Int. Cl.⁷ .................................................. G11B 7/00
(52) U.S. Cl. .................................. 369/47.17; 369/47.28
(58) Field of Search ............................... 360/46, 51, 67, 360/65; 375/234, 236, 317; 369/48, 54, 124.11, 59

(56) References Cited

U.S. PATENT DOCUMENTS

| | | | | |
|---|---|---|---|---|
| 5,056,118 A | * | 10/1991 | Sun | 375/106 |
| 5,093,847 A | * | 3/1992 | Cheng | 375/96 |
| 5,204,848 A | * | 4/1993 | Cardero et al. | 369/48 |
| 5,367,411 A | * | 11/1994 | Nishiyama et al. | 360/66 |
| 5,467,331 A | * | 11/1995 | Saiki et al. | 369/124.11 X |
| 5,592,456 A | * | 1/1997 | Miyashita et al. | 369/59 |
| 5,710,750 A | * | 1/1998 | Tachibana | 369/124.14 X |
| 5,764,695 A | * | 6/1998 | Nagaraj et al. | 375/232 |
| 5,825,570 A | * | 10/1998 | Kanegae et al. | 360/46 X |
| 5,831,951 A | * | 11/1998 | Kamioka et al. | 369/59 X |
| 5,966,356 A | * | 10/1999 | Kawashima et al. | 369/48 |
| 6,005,363 A | * | 12/1999 | Aralis et al. | 360/51 X |
| 6,005,729 A | * | 12/1999 | Poss | 360/46 X |
| 6,009,134 A | * | 12/1999 | Yoon | 375/376 |
| 6,097,769 A | * | 8/2000 | Sayiner et al. | 375/341 |

* cited by examiner

*Primary Examiner*—Aristotelis M. Psitos
(74) *Attorney, Agent, or Firm*—W. Daniel Swayze, Jr.; W. James Brady; Frederick J. Telecky, Jr.

(57) ABSTRACT

A method and apparatus to make the signal slice level during data qualification in an Optical Disc apparatus adaptable to DSV variation. According to this method, phase error signals from a Phase Locked Loop (PLL) subjected to the input data signal are used to generate Pump Up (PU) and Pump Down (PD) signals. These signals are used to determine a direction and degree of a slice level shift and to control a voltage adjustment, by feedback, of the modulated input analog signal to compensate for the slice level shift. The present invention also adapts to the presence of non-zero DSV, or DC components, by generating phase error signals (also by the PLL) when DC components (and corresponding DSV variation) are detected. When DC components are detected, slice level shift is cancelled. In this manner, the method suppresses a system response to any effects of DC component variation and thereby adapts to their presence.

3 Claims, 4 Drawing Sheets

JITTER FEEDBACK SLICER

BACKGROUND OF THE INVENTION

1. Field of the Invention

The present invention relates to the field of signal modulation and, more particularly, to the qualification of signals in an optical disc apparatus.

2. Description of the Related Art

As part of the process of recording or reproducing digital signals, a modulator converts an input analog signal into digital code suitable for the characteristics of a recording/reproducing system. This conversion is known as channel coding. In a conventional optical disc playback apparatus, modulated signals contain an average DC voltage component equal to zero (known as "DC-free" code) and the long term average duty cycle is typically specified as 50%.

In some conventional optical disc systems such as Compact Disk (CD) and Digital Versatile Disc—Read Only Memory (DVD-ROM), a duty cycle detection feedback method is commonly employed for data qualification during the processing of digital signals. This method relies on the "DC-free" nature of the code. The basic approach of this method is to monitor the DC content of the digital data using a threshold detector, and to control the threshold level until a 50% duty cycle is achieved in the digital stream.

For example, in typical CD systems, signal modulation is performed according to the Eight-to-Fourteen Modulation (EFM) code protocol. In EFM, an 8-bit input code is converted into a 14-bit channel code by an encoder. However, the encoder uses only $2^8$ of all possible 14-bit words of which there are $2^{14}$. In particular, only those 14-bit words which satisfy a (2,10) run length constraint are used. The designation (2,10) means that there are at least two zeros, and no more than ten zeros, between successive 1's in the digital stream of data comprised of these encoded 14-bit word. Since there are at least 2 and not more than 10 "0"s between two consecutive "1"s, a period (or wavelength) of a low level or a high level Non return to Zero Inverted (NRZ-I) waveform is always between 3T and 11T, where T is defined as one period of the channel clock. Therefore, under this protocol a 100100 (3T/3T) signal corresponds to the highest channel frequency and a 10000000000100000000000 (11T/11T) signal corresponds to the lowest channel frequency. The EFM encoder also adds 3 additional merging or linking bits between each consecutive 14-bit word encoded word to force the average duty cycle of the digital stream to the specified 50%, and to eliminate run-length violations where successive code words are linked serially. Where long term duty cycles of 50% are specified and maintained, the code is then considered to be "DC-free."

In conventional DVD systems, such as in DVD-ROM systems, EFM Plus (eight-to-sixteen) code protocol is used for signal modulation. In the EFM Plus protocol, an 8-bit input code is converted into a 16-bit channel code by an encoder. As in the CD system described above, the EFM Plus encoder also generates (2,10) run length limited (RLL) code for use in conventional DVD-ROM systems. DC component suppression in a conventional DVD system, however, is controlled by four selectable DC component suppression (DCC) algorithms contained in the system.

In both the EFM protocol used in conventional CD systems and the EFM Plus protocol used in conventional DVD-ROM systems, the duty cycle correction or slicing schemes utilize the "DC-free" nature of the code. Therefore both the EFM and EFM Plus modulation protocols as implemented in CD and DVD-ROM systems result in signals that are free of DC components. In other words, the Digital Sum Value (DSV) of these data signals over the long term is zero. As is well known in the art, DSV is the summed value of the data in which a "high level" is defined as a "+1" signal and a "low level" is defined as a "−1" signal. Thus, for a stream of NRZ-I encoded digital data, DSV=(high level period)×(+1)+(low level period)×(−1).

The long term summation of DSV, and correspondingly, of the DC components, is zero in "DC-free" code, because, the result of summing "+1" and "−1" data values over a 50% duty cycle period is equal to zero. This prior art duty cycle detection feedback or slicing method can be used as long as the modulated signal remains DC-free and does not contain DC components. According to this method, asymmetry in the modulated digital signal is easily cancelled by using a negative feedback loop, since the data stored on the disc does not include DC components. A typical duty cycle detection feedback control loop to perform the slicing function has a low bandwidth, typically in the tens of kHz range.

The duty cycle detection feedback method described above is effective only when DC free code is used. When the data contains DC components (or the DSV is not equal to zero), however, the duty cycle detection feedback method cannot compensate for non-zero DSV since the slice level is fixed and limited by the AC ground level.

Non-zero DSV can occur in some DVD systems such as a DVD-RAM system. In DVD-RAM systems, the signal modulation code follows the EFM Plus protocol, similar to that of a DVD-ROM system, to maintain compatibility with DVD-ROM systems. The (2,10) RLL codes similar to those found in DVD-ROM systems and described above are also used. However, in DVD-RAM systems, data is usually written in Error Correction Code (ECC) block sizes of 32 kbytes. The DC component suppression control algorithms found in DVD-ROM systems would typically process the written data to limit DC components over the long term to zero. In a DVD-RAM application, however, limitations in the computational capability of algorithms of the type found in DVD-ROM systems, such as limitations in buffer size, result in some DSV variation and the presence of DC components in the resultant signal. When such a condition occurs, the conventional duty cycle detection feedback slicing method is inadequate, since the slice level cannot be adjusted to compensate for the presence of DC components. For example, in an instance where an initial data stream is 00/01/02/03 (Hex, 4bytes), the data is modulated to:

00100000000010010010000000010010001000010010-00000100010010000000.

The DSV summation for this stream is:−2+10−3+3−9+3−4+5−3+7−4+3−8=−2. In another example, where the data stream is 5C/FE/5C/FE (Hex, 4 bytes), the data is modulated to:

00100001000010001001000000010000010000000001-00010000001001000100.

The DSV summation of this stream −2+5−5+4−3+8−6+10−4+7−3+4−3=+12. When these example data streams occur recursively or are repeated, the DSV summation over the long term varies from zero, DC components result, and the effective slice level differs from the AC ground level. When such a condition exists, the conventional duty cycle detection feedback method is inadequate and a method that performs slicing that is adaptable to variations in DSV is required.

SUMMARY OF THE INVENTION

Accordingly, the present invention is directed to a method and apparatus for adapting the signal slice level during data qualification in an optical disc apparatus to DSV variation, and also for substantially obviating one or more of the problems due to the limitations and disadvantages associated with the conventional duty cycle detection feedback method.

According to this method, phase error signals from a Phase Locked Loop (PLL) subjected to an input data signal are used to generate Pump Up (PU) and Pump Down (PD) signals. These signals are used to determine a direction and degree of a slice level shift and to control a voltage adjustment, through the use of feedback, of the modulated input analog signal to compensate for the slice level shift. The present invention also adapts to the presence of non-zero DSV, (or DC components) by generating phase error signals (also by the PLL) when DC components (and corresponding DSV variation) are detected. When DC components are detected, slice level shift is cancelled. In this manner, the method suppresses a system response to any effects of DC component variation and thereby adapts to their presence.

It is to be understood that both the foregoing general description and the following detailed description are merely exemplary and explanatory in nature and are intended to provide further explanation of the present invention as claimed.

BRIEF DESCRIPTION OF THE DRAWINGS

The accompanying drawings are included to provide a further understanding of the present invention and are incorporated in and constitute a part of this specification. The drawings illustrate a presently preferred embodiment of the invention and, together with the description, serve to explain the principles of the invention.

DETAILED DESCRIPTION OF THE PREFERRED EMBODIMENTS

Reference will now be made in detail to the present preferred embodiment of the invention, an example of which is illustrated in the accompanying drawings.

Figure 3:
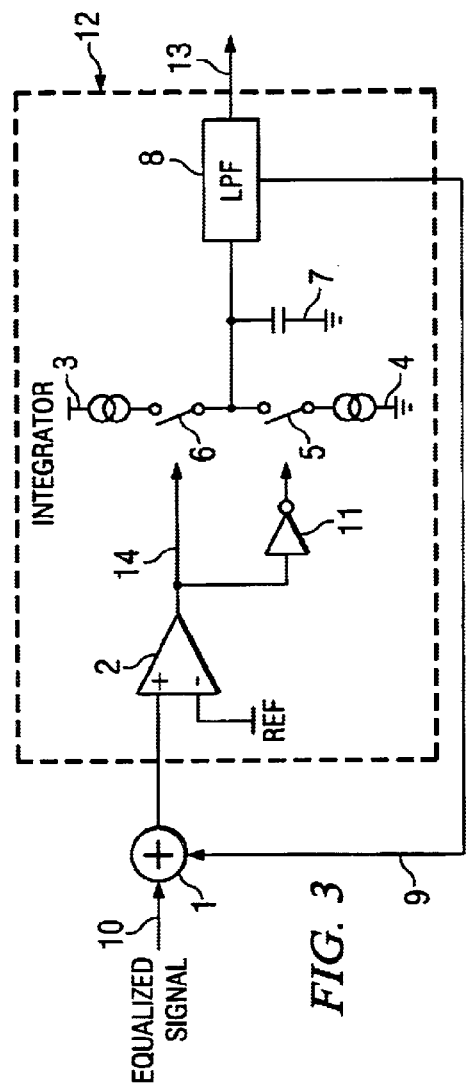
FIG. 3 illustrates a conventional duty cycle detection feedback circuit.

A typical duty detection cycle feedback circuit is shown in FIG. 3. In this circuit, an equalized signal 10 is input to an adder 1. The output of the adder 1 is coupled to an integrator 12 comprised of a comparator 2, an inverter 11, positive power supply 3, negative current source 4, switches 5 and 6, capacitor 7 and low pass filter 8. The output of adder 1 is coupled to one input of comparator 2. The other input of comparator 2 is coupled to a reference voltage. The output of comparator 2 is selectively coupled through switch 6 to the input of low pass filter 8. The output of comparator 2 is also coupled to the input of inverter 11. The output of inverter 11 is selectively coupled through switch 5 to the input of low pass filter 8. Also coupled to the input of the low pass filter 8 are a current sources 3 and 4, and one end of a capacitor 7. The other end of current source 3 is coupled to a positive power supply voltage, and the other end of current source 4 and of capacitor 7 are coupled to ground. A feedback signal 9 from low pass filter 8 is coupled as the other input to adder 1. When switch 5 is closed, switch 6 is open, and inverter 11 is coupled to capacitor 7 and lowpass filter 8. When switch 5 is open, switch 6 is closed, and the output of comparator 2 is coupled to capacitor 7 and low pass filter 8.

The comparator 2 is provided as the RF input signal slicer, where the input RF signal is an analog signal that is digitized to a digital data stream. If the modulated signal 14 is AC coupled and there are no DC components or asymmetry, the slice level of the comparator is fixed, and corresponds to the AC ground level. In FIG. 3, a feedback signal 9 from low pass filter 8 is shown. This feedback signal is referred to as the duty detection cycle feedback.

Even though the modulated signals in CD-ROM and DVD-ROM systems do not contain DC components, they may include asymmetry caused by pit style and deficiencies in tracking accuracy (de-track). To compensate for this, the duty cycle detection feedback signal 9 is useful in reducing asymmetry and achieving a 50% duty cycle output signal. In the circuit of FIG. 3, the input signal 10 level is shifted by the feedback signal 9 to improve the duty of the signal.

When the circuit or slicer output 14 is "high," switch 6 is closed, switch 5 is opened and capacitor 7 is charged by the current from positive current source 3. The voltage level (Vhc) of the top plate of the capacitor 7 is given by:

$Vhc = I$(charge current from positive current source)$\times T$(high period)$/C$(capacitance value)

When the slicer output is "low," switch 6 is opened, switch 5 is closed and capacitor 7 is discharged by the current from negative current source 4. In this example, the positive current source 3 and negative current source 4 are identical. If the high and low level periods are the same length, voltage Vhc returns to its initial level, because the charged value and discharged value are of the same magnitude. Therefore, the rate and period of increase of Vhc is the same as the rate and period of decrease of Vhc. One plate of the capacitor 7 is connected to low pass filter 8. Therefore, the output of low pass filter 8 is stable when a duty cycle of 50% signal is achieved. When the input signal does not conform to a 50% duty cycle, feedback is introduced to the input signal to add some DC level to the input equalized signal and to thereby cancel any variation from the DC free nature of the signal.

In a conventional duty detection cycle feedback circuit, the current value of the current sources and low pass filter cutoff frequency are optimized for the input signal frequency. The resultant signal of integrator 12 is introduced as feedback signal 9 at node 1 of the circuit, where it is combined with the equalized signal 10 which is input into comparator 2. In this manner the D.C. content of the modulated digital stream is monitored until a 50% duty cycle is achieved. This circuit, however cannot adapt to the presence of DC components in the data stream over the long term.

Figure 1:
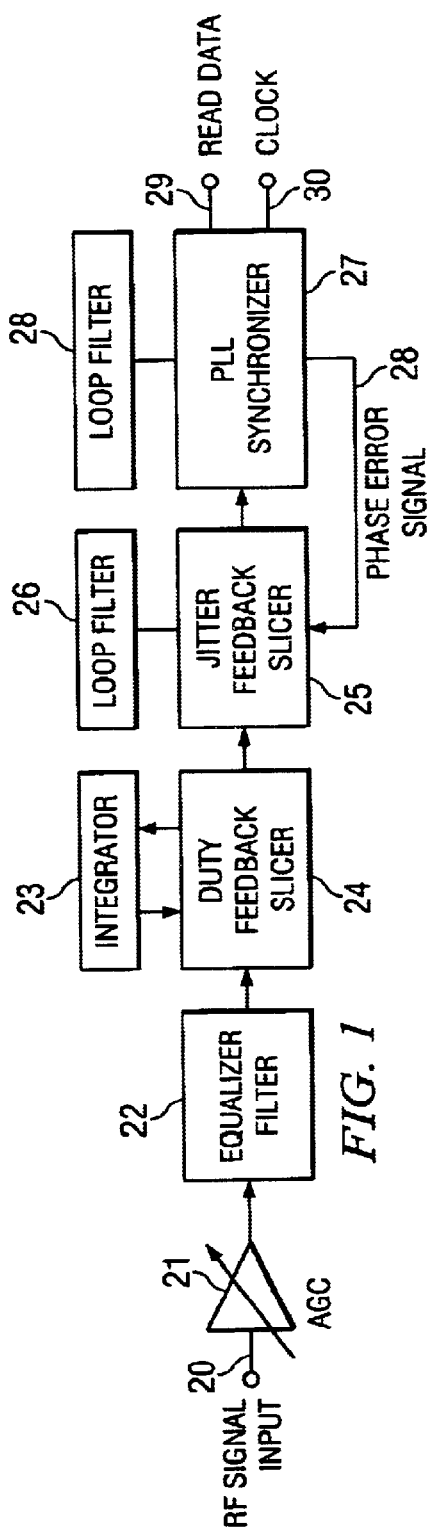
FIG. 1 illustrates a system according to the present invention.

As shown in FIG. 1, a system according to the present invention includes an equalized RF analog signal 20 input into an auto gain control amplifier 21 which is electrically coupled to an equalizer filter 22. Equalizer filter 22 is electrically coupled to a duty cycle detection feedback slicer 24. Duty cycle detection feedback slicer 24 is coupled to, and forms a combination with, an integrator 23 which provides feedback to slicer 24. Duty cycle detection feedback slicer 24 is electrically coupled to jitter feedback slicer 25. Jitter feedback slicer 25 is coupled to, and forms a combination with, a loop filter 26, and the combination of jitter feedback slicer 25 and loop filter 26 is electrically coupled with a PLL synchronizer 27. PLL synchronizer 27 is coupled to, and forms a combination with a loop filter 28. PLL synchronizer 27 generates phase error signals 31, which are introduced as feedback to jitter feedback slicer 25. PLL synchronizer 27, is also coupled with digital read data 29 and channel data clock 30. In this system, the data qualifier contained in the PLL processing block 27 converts an analog input to the PLL to a digitized read signal, and a timing recovery circuit synchronizes the digitized read signal with the channel data clock 30 thereby regenerating EFM or EFM Plus modulated digital data via the PLL. The jitter feedback slicer 25 responds to phase error signals 28 generated by the PLL processing block to raise or lower the voltage of loop filter 26. The raised or lowered loop filter voltage is added to the input signal to compensate for slice level shifts as discussed below.

Figure 2:
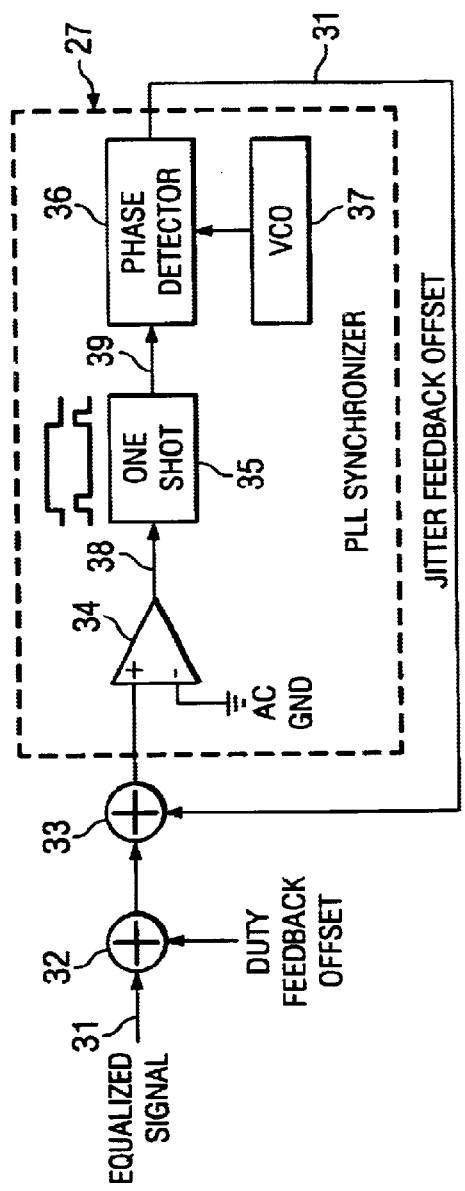
FIG. 2 illustrates a system according to the present invention further detailing elements of FIG. 1.

The system depicted in FIG. 1 is further detailed in FIG. 2. FIG. 2 depicts an equalized signal 31, subjected to a duty cycle feedback offset at node 32 by a conventional duty cycle feedback detector, and subsequently to jitter feedback offset at node 33. The jitter feedback offset is generated by phase error signals generated by the PLL processing block 27 of FIG. 1. In FIG. 2, the PLL processing block 27 is represented by a slice comparator 34, a one shot pulse vibrator 35, a phase detector 36 and a VCO 37. The equalized input signal 31, after being subjected to duty cycle feedback offset at node 32, is fed into slice comparator 34, which includes a slice level control circuit. The other input of comparator 34 is coupled to AC ground. A comparator output signal 38 (RDO) is fed into the one shot pulse vibrator 35, which produces Delayed Read Data (DRD) 39. The DRD 39 has a pulse width corresponding to ½ that of the VCO 37 period. Both the read data 39 and the output of the VCO 37 are coupled to a phase detector 36, which detects the difference in phase (if any) between the read data signal 39 and the output of the VCO 37. If the frequency of the read data 39 is not in phase with the output of the VCO 37, a phase error signal 31, which corresponds to the phase difference between the VCO 37 and the read data frequency 39, is generated. This phase error signal 31 is then used to adjust the input signal at adder 33 to correct this phase difference. In this manner, the read data frequency is locked to the VCO 37 frequency. Additionally, the phase error signal 31 generated in response to the phase difference between the read data stream and the VCO 37 produces a slice level shift, discussed in more detail below. In another embodiment of the present invention, the use of duty cycle detection feedback as shown in FIGS. 1 and 2 can be eliminated and sole reliance for data qualification be based on jitter feedback because the performance of the Jitter Feedback system generally exceeds that of a conventional Duty Cycle Detection Feedback method or device.

When the read data stream contains DC components, the PLL generates a phase error signal 31. However, when this condition occurs, adjustment of the read data stream frequency is suppressed and although DC components and corresponding DSV are present in the read data stream, the slice level shift is adjusted in response to the phase error signal. Thus, the phase error signal produced in response to the presence of DC components, or DSV variation, is used to compensate for any slice shift caused by DC components. In this manner, the system adapts to the presence of DC components in the read data stream by effectively suppressing any response when they are present.

Figure 4:
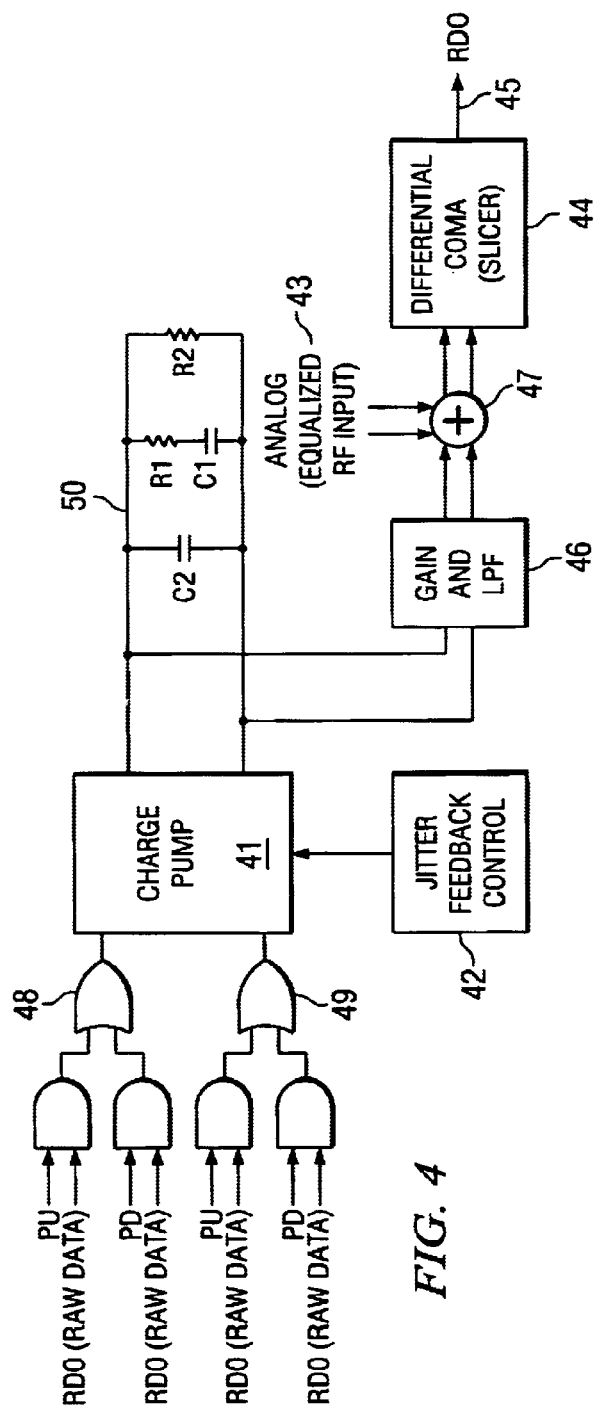
FIG. 4 illustrates a block diagram showing the relationship between the Jitter Feedback Control, Charge Pump and upper and lower slice level shifts according to the methodology of the present invention.
Figure 5:
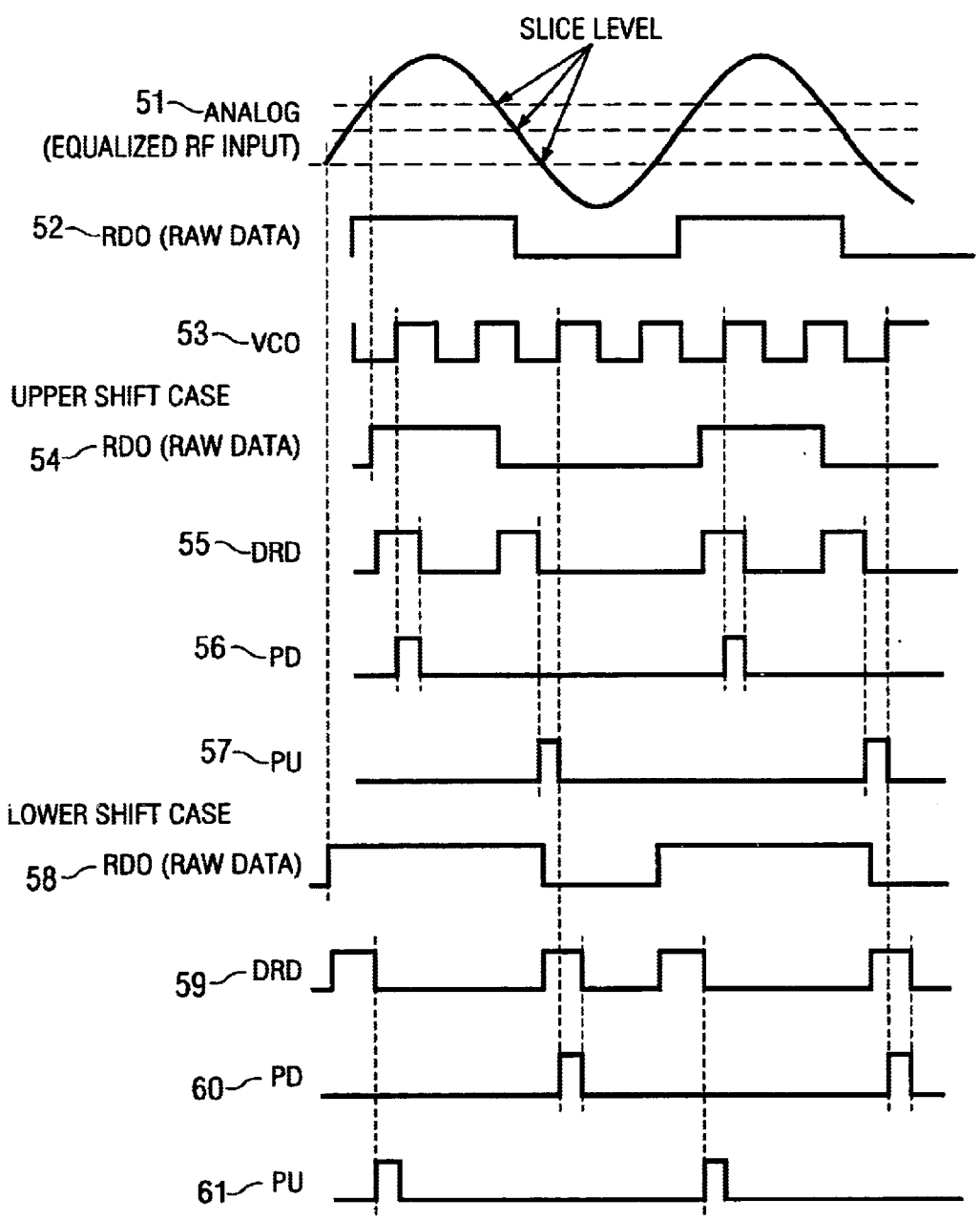
FIG. 5 represents a timing diagram illustrating the relationships between signals and timing according to the methodology of the present invention.

The operation of the system of the present invention and the mechanism whereby the slice level of the present invention is shifted is further illustrated in FIGS. 4 and 5.

FIG. 4 depicts the mechanism by which the system analog input signal is offset as indicated by node 33 of FIG. 2. In FIG. 4, a charge pump 41 is subjected to jitter feedback control 42 which controls the phase error signals generated by PLL 27 (FIG. 1). These phase error signals are in the form of Pump Up (PU), and Pump Down (PD) signals. These PU and PD signals common to both an upper slice level shift case as designated by logic node 48, or a lower slice level shift case as designated by logic node 49. As a general principle of the invention, the phase error signals 31 (FIG. 1) generated by the PLL 27 described earlier, generate Pump Up (PU) and Pump down (PD) signals. The generated PU and PD signals operate to trigger Charge Pump 41 (FIG. 4) to charge or discharge a loop filter 50. The resultant raised or lowered loop filter voltage is added to the RF analog input signal 43 via a gain and low pass filter 46. The voltage addition occurs at node 47, followed by signal slicing by a differential comparator 44. Differential comparator 44 produces a raw data signal 45 (RDO)

The loop filter 50 (FIG. 4) used in the jitter feedback of the present invention, is very similar to a conventional PLL loop filter. A "one zero" "one pole" type loop filter can be used for the jitter feedback circuit, which has the following transfer function:

$$F(s)+(1+sC1R1)/sC1(1+C2/C1+sC2R1)) \quad (1)$$

And if C1>>C2, then, $$F(s)=(1+sC1R1)/(sC1) \quad (2)$$

The loop filter voltage is fed back via low pass filter and gain amplifier 46, then corrects the slice level offset of the comparator 44. The newly established slice level compensates for the phase error. In the preferred embodiment, a "one zero" and "one pole" type loop filter is used. It is possible to use a "one pole loop" for the sake of simplicity. In general, a PU signal is generated when the rising or falling edge of the raw data signal (RDO) is ahead of the rising edge of the VCO clock, while a PD signal is generated when each edge of the RDO is behind the rising edge of the VCO clock. The direction of slice level shift, i.e. whether to raise or lower the RF analog input signal voltage, is determined by the relationship between the RDO and the PU or PD signal.

FIG. 5 further details the mechanism of slice level shift of the present invention. An analog equalized signal 51 is depicted and corresponding RDO 52, and VCO 53 timing is illustrated. Timing of RDO 54, digital read data 55, pump down (PD) 56 and pump up (PU) 57 signaling corresponding to an upper slice level shift case are also shown. Timing of RDO 58, DRD 59, PD 60, and PU 61 signaling corresponding to a lower slice level shift case is also depicted. As shown in FIG. 5 when the RDO 54 is of a "high" value, and a PD 56 signal occurs, followed by a PU 57 signal when the RDO 54 drops to a "low" level, the direction of slice level shift is to the upper shift case. Conversely, if a PU 61 signal occurs when the RDO 58 is "high", followed by a PD 60 signal when the RDO 58 drops to a "low" level, the direction of slice level shift is to the lower shift case. The degree of slice level shift for either the upper or lower shift cases depends on the pulse width of the PU and PD signals. FIG. 4 shows the logic of the PU and PD signals. In both the upper and lower shift cases, the PU and PD pulses signal the Charge Pump 41 of FIG. 4 to generate current pulses which either charge or discharge the loop filter 50, and the resultant raised or lowered loop filter voltage is added to the input analog signal 43 before slicing in order to compensate for the upper or lower shift of the slice level.

As described earlier in the context of the system of the present invention, the jitter feedback system of the present invention can be used to suppress a response to DC component variation in the signal stream. In the context of the phase error (PU and PD) signals, this function is accomplished as follows. When DC components are present, the pulse width of the PU and PD signals increase at the same time, and by the same amount. This simultaneous increase in pulse width generates offsetting slice level logic signals to the Charge pump 41 (FIG. 4).

Figure 6:
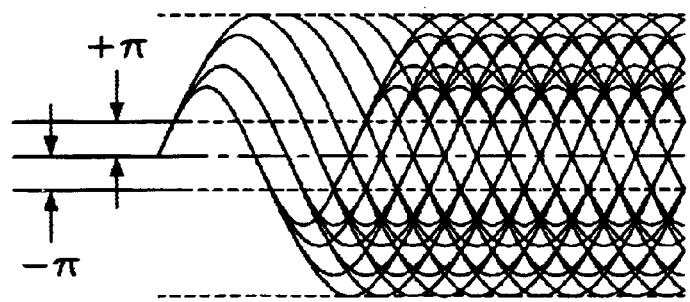
FIG. 6 illustrates the relationship between slice level and phase error according to the present invention.

FIG. 6 shows the relationship between the slice level shift value and phase error. Assuming the code rate period is $2\pi$, when the slice level shifted to $\pi$, the PLL would not be able to lock properly and 3T/3T read data is mistaken for 2T/4T. Therefore, the maximum allowable value of phase error is $\frac{1}{2}\pi$. If the slice level exceeds $\frac{1}{2}\pi$ phase error value, the jitter feedback makes the PLL mislock. To avoid this condition, jitter feedback should be disabled before the slice level exceeds $\frac{1}{2}\pi$.

Figure 7:
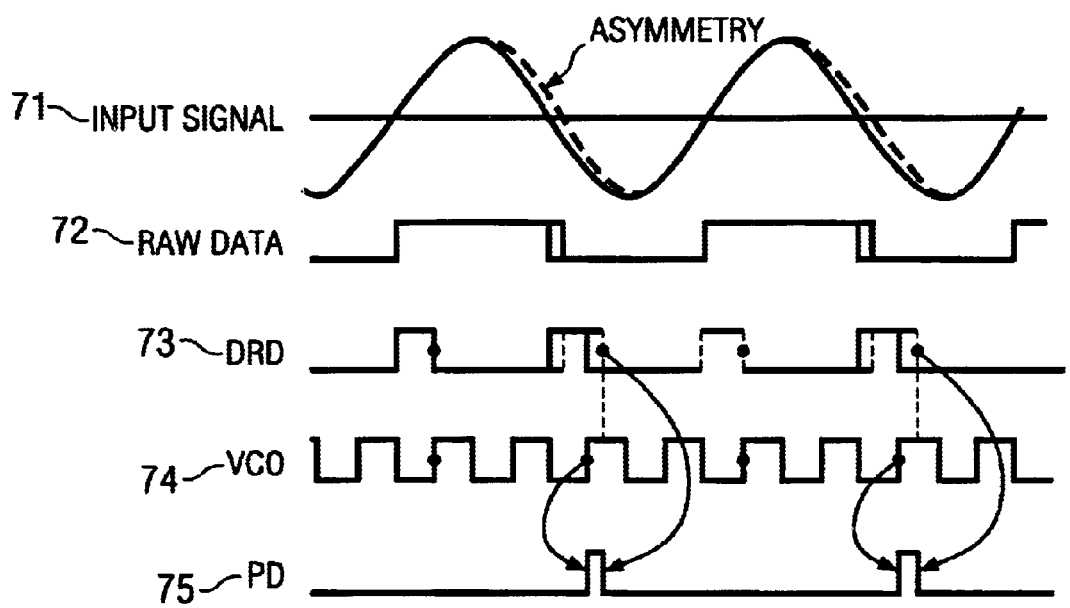
FIG. 7 illustrates the effectiveness of the present invention in compensating for DSV and signal asymmetry.

FIG. 7 shows that Jitter Feedback is effective in compensating not just for DSV but also signal asymmetry. In FIG. 7, an analog input signal 71 is shown. Timing of the raw data 72, DRD 73, VCO 74 and PD signaling 75 is also shown. In FIG. 7, the falling edge of the raw data 72 and and of the DRD 73 are delayed from the right timing. The resulting phase error is the same as if the signal included asymmetry. The jitter feedback of the present invention produces a lower slice level shift by the PD signal 75 corresponding to a voltage offset which is then added to the input signal to compensate for the slice level shift.

It will be apparent to those skilled in the art that various modifications and variations can be made to the jitter feedback method and apparatus without departing from the spirit or scope of the invention. Thus, it is intended that the present invention cover the modifications and variations of this invention provided they come within the scope of the appended claims and their equivalents.

What is claimed is:

1. A method for the qualification of signals in optical disk apparatus comprising the steps:

inputting an analog input signal to a phase locked loop synchronizer, said phase locked loop synchronizer generating at least one phase error signal in response to said analog input signal;

detecting a direction, and magnitude of a slice level shift from a slicer based on said at least one phase error signal;

controlling said slicer to effect said slice level shift in accordance with said direction and said magnitude; and adjusting a voltage of said analog input signal in accordance with said direction of said slice level shift and said phase error signal wherein said voltage of said analog input signal is one of increase or decreased to compensate for said slice level shift.

2. The method of claim 1, wherein said analog input signal is equalized to form an RF, equalized signal input.

3. The method of claim 1, wherein said at least one phase error signal comprises at least one of a pump up and pump down signal.

* * * * *